United States Patent
Yoshino et al.

(10) Patent No.: US 12,515,278 B2
(45) Date of Patent: Jan. 6, 2026

(54) SHEET PROCESSING METHOD AND SHEET PROCESSING APPARATUS

(71) Applicant: TOPPAN Inc., Tokyo (JP)

(72) Inventors: Masaaki Yoshino, Taito-ku (JP); Tomomi Hiraoka, Anan (JP); Sawa Minami, Anan (JP)

(73) Assignee: TOPPAN Inc., Tokyo (JP)

( * ) Notice: Subject to any disclaimer, the term of this patent is extended or adjusted under 35 U.S.C. 154(b) by 920 days.

(21) Appl. No.: 17/543,867

(22) Filed: Dec. 7, 2021

(65) Prior Publication Data

US 2022/0088713 A1    Mar. 24, 2022

Related U.S. Application Data

(63) Continuation of application No. PCT/JP2020/022365, filed on Jun. 5, 2020.

(30) Foreign Application Priority Data

Jun. 7, 2019   (JP) ................. 2019-107028

(51) Int. Cl.
  *B23K 26/351*   (2014.01)
  *B23K 26/00*    (2014.01)
  (Continued)

(52) U.S. Cl.
  CPC ........ *B23K 26/351* (2015.10); *B23K 26/0006* (2013.01); *B23K 26/009* (2013.01);
  (Continued)

(58) Field of Classification Search
  CPC ........ G02F 1/13439; G02F 1/155; G02F 1/15; B23K 26/24; B23K 26/57; B23K 26/351;
  (Continued)

(56) References Cited

U.S. PATENT DOCUMENTS

| | | | | |
|---|---|---|---|---|
| 3,652,929 | A * | 3/1972 | Cushman | G01R 27/02 324/548 |
| 12,007,653 | B2 * | 6/2024 | Stelzer | G02F 1/1334 |
| 2013/0248844 | A1 * | 9/2013 | Hiraoka | H10K 71/00 438/4 |

(Continued)

FOREIGN PATENT DOCUMENTS

| DE | 10 2008 038 118 A1 | 2/2010 |
|---|---|---|
| JP | 2008-276057 A | 11/2008 |

(Continued)

OTHER PUBLICATIONS

Machine translation of WO-2014072137-A1 (Year: 2014).*

(Continued)

*Primary Examiner* — Steven W Crabb
*Assistant Examiner* — Fahmida Ferdousi
(74) *Attorney, Agent, or Firm* — Oblon, McClelland, Maier & Neustadt, L.L.P.

(57) ABSTRACT

A sheet processing method including irradiating a transparent conductive layer covered with a transparent sheet with a pulsed laser beam such that the pulsed laser beam is applied to a portion of the transparent conductive layer through the transparent sheet, and that the portion irradiated has an insulating property. The pulsed laser beam has a top-hat intensity distribution and has a transmittance through the transparent sheet being higher than a transmittance through the transparent conductive layer.

20 Claims, 3 Drawing Sheets

(51) Int. Cl.
  *B23K 26/0622*  (2014.01)
  *B23K 26/073*  (2006.01)
  *B23K 103/16*  (2006.01)
  *G02F 1/15*  (2019.01)
  *G02F 1/155*  (2006.01)

(52) U.S. Cl.
  CPC ........ *B23K 26/0624* (2015.10); *B23K 26/073* (2013.01); *G02F 1/155* (2013.01); *B23K 2103/172* (2018.08); *G02F 1/15* (2013.01)

(58) Field of Classification Search
  CPC .............. B23K 26/009; B23K 26/0624; B23K 26/073; B23K 2103/172; B23K 26/0006; E06B 2009/2464
  See application file for complete search history.

(56) References Cited

U.S. PATENT DOCUMENTS

| | | | | |
|---|---|---|---|---|
| 2016/0138328 | A1* | 5/2016 | Behmke | B32B 17/10532 359/275 |
| 2018/0011359 | A1* | 1/2018 | De Jong | G02F 1/13338 |
| 2020/0233277 | A1 | 7/2020 | Kubo et al. | |
| 2021/0208321 | A1* | 7/2021 | Takahashi | G02B 5/3016 |

FOREIGN PATENT DOCUMENTS

| | | | | |
|---|---|---|---|---|
| JP | 2014060392 | A * | 4/2014 | |
| JP | 2014072268 | A * | 4/2014 | |
| JP | 2019-070789 | A | 5/2019 | |
| WO | WO-2014072137 | A1 * | 5/2014 | ............. B23K 26/40 |
| WO | WO-2017218705 | A1 * | 12/2017 | ....... B32B 17/10146 |
| WO | WO-2018194481 | A1 * | 10/2018 | |

OTHER PUBLICATIONS

Machine English translation of JP-2014060392-A (Year: 2014).*
Machine English translation of JP-2014072268-A (Year: 2014).*
Sabic, https://www.sabic.com/en/products/polymers/polyethylene-terephthalate-pet, Mar. 2019 (Year: 2019).*
English translation of WO-2014072137-A1 (Year: 2014).*
English translation of JP-2014060392-A (Year: 2014).*
Sabic, https://www.sabic.com/en/products/polymers/polyethylene-terephthalate-pet, Mar. 2019 (Year: 2019) (Year: 2019).*
International Search Report issued Sep. 8, 2020 in PCT/JP2020/022365, filed Jun. 5, 2020, 5 pages (with English Translation).
Extended European Search Report issued Jul. 5, 2022 in European Patent Application No. 20817966.3, 7 pages.

* cited by examiner

SHEET PROCESSING METHOD AND SHEET PROCESSING APPARATUS

CROSS-REFERENCE TO RELATED APPLICATIONS

The present application is a continuation of International Application No. PCT/JP2020/022365, filed Jun. 5, 2020, which is based upon and claims the benefits of priority to Japanese Application No. 2019-107028, filed Jun. 7, 2019. The entire contents of all of the above applications are incorporated herein by reference.

BACKGROUND OF THE INVENTION

Field of the Invention

The present invention relates to a sheet processing method, and a sheet processing apparatus for processing a sheet.

Discussion of the Background

In recent years, functional sheets have been put into practical use in various fields. Functional sheets are provided with a plurality of laminated layers made of different materials, and thus the functional sheets exhibit a predetermined function. For example, Patent Literature 1 discloses an EC (Electro Chromic) element as a functional sheet applied to a variable transmission window and the like. The EC element includes a pair of transparent sheets, a pair of transparent conductive layers, and an EC layer. Specifically, in the EC element, the EC layer is sandwiched between the pair of transparent conductive layers in the thickness direction of the EC layer, and the pair of transparent conductive layers are sandwiched between the pair of transparent sheets. An edge surface of the EC element is provided with a sealing portion. The sealing portion effectively prevents defects caused by the entry of water, conductive foreign matter, or the like from the edge surface of the EC element, for example, a short circuit between the transparent conductive layers.

PTL 1: JP 2019-070789 A

SUMMARY OF THE INVENTION

According to an aspect of the present invention, a sheet processing method includes irradiating a transparent conductive layer covered with a transparent sheet with a pulsed laser beam such that the pulsed laser beam is applied to a portion of the transparent conductive layer through the transparent sheet, and that the portion irradiated has an insulating property. The pulsed laser beam has a top-hat intensity distribution and has a transmittance through the transparent sheet being higher than a transmittance through the transparent conductive layer.

According to another aspect of the present invention, a sheet processing apparatus includes a sheet processing apparatus including an irradiation unit that irradiates a transparent conductive layer covered with a transparent sheet with a pulsed laser beam which has a top-hat intensity distribution and has a transmittance through the transparent sheet being higher than a transmittance through the transparent conductive layer, and an application unit that applies an AC voltage to the transparent conductive layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
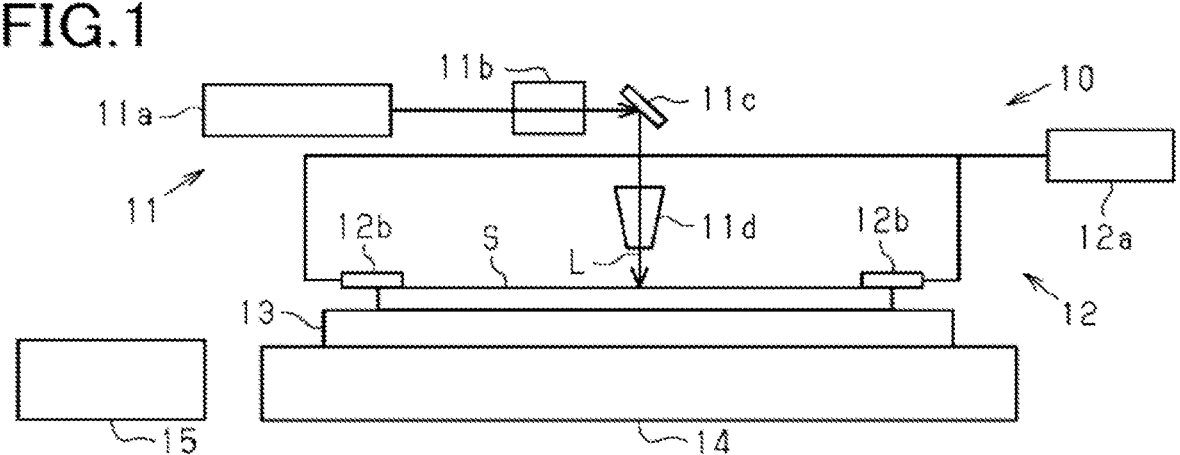
FIG. 1 is a schematic diagram showing a sheet processing apparatus of an embodiment.

The embodiments will now be described with reference to the accompanying drawings, wherein like reference numerals designate corresponding or identical elements throughout the various drawings.

An embodiment of a sheet processing method and a sheet processing apparatus will be described with reference to FIGS. 1 to 5. In the following, a sheet processing apparatus, an EC element which is an example of a sheet to be processed, and a method of processing the EC element using the sheet processing apparatus will be sequentially described.

<Sheet Processing Apparatus>

A sheet processing apparatus will be described with reference to FIG. 1.

As shown in FIG. 1, a sheet processing apparatus 10 includes an irradiation unit 11 and an application unit 12. The irradiation unit 11 focuses a pulsed laser beam L having a top-hat intensity distribution on an irradiation target S, and irradiates the irradiation target S with the pulsed laser beam L. That is, the irradiation unit 11 irradiates the irradiation target S with the pulsed laser beam L while the pulsed laser beam L is focused on the irradiation target S. The application unit 12 applies an AC voltage to the irradiation target S.

The irradiation unit 11 includes a laser source 11a, a top-hat optical system 11b, a mirror 11c, and a condenser lens 11d. The laser source 11a generates the pulsed laser beam L with which the irradiation target S is to be irradiated. The intensity distribution of the pulsed laser beam L on a plane perpendicular to the optical axis of the pulsed laser beam L is a Gaussian distribution. In the present embodiment, the laser source 11a preferably generates ultrashort pulsed light as the pulsed laser beam L. Ultrashort pulsed light has a pulse width calculated as a full width at half maximum of, for example, 1000 femtoseconds or less. If the pulse width is longer than 1000 femtoseconds, that is, if the pulse width is of a nanosecond order or picosecond order, air bubbles are more likely to be produced in a target irradiated with the pulsed laser beam L. Thus, when the pulse width is 1000 femtoseconds or less, it is possible to prevent the generation of air bubbles in the target irradiated with the laser beam. In the present embodiment, the pulse width of the ultrashort pulsed light is 290 femtoseconds.

The pulsed laser beam L has an infrared wavelength. The wavelength of the pulsed laser beam L is preferably 1030 nm or more. The intensity of the pulsed laser beam L is preferably 0.1 W or less, from the viewpoint of preventing deformation and degradation of a resin sheet included in a sheet to be processed.

The top-hat optical system 11b converts the intensity distribution of the pulsed laser beam L generated by the laser source 11a from the Gaussian distribution into a top-hat distribution. The top-hat optical system 11b may include, as a device for shaping the pulsed laser beam L, for example, a diffraction grating, a homogenizer, or a field mapping type forming device.

The pulsed laser beam L, formed in a top-hat shape, preferably has an M squared value of, for example, 1.1 or more and 1.5 or less. The M squared value is a ratio ($BPP_M/BPP_R$) of the beam parameter product ($BPP_M$) of an actual pulsed laser beam L to the beam parameter product ($BPP_R$) of a laser beam having an ideal Gaussian distribution.

The mirror 11c may be configured to reflect light toward a single position on a stage 13. Alternatively, the mirror 11c may be a galvano optical system, which is an example of a scanning optical system. The galvano optical system is configured to be able to scan a portion of the irradiation target S that is to be irradiated with the pulsed laser beam L, according to the coordinates set on the XY plane on which the irradiation target S is disposed.

The condenser lens 11d is configured to be able to change the distance to the irradiation target S in the Z direction perpendicular to the XY plane. Thus, the condenser lens 11d can change a position on which the pulsed laser beam L is focused. When the mirror 11c is a galvano optical system, the condenser lens 11d is an fθ lens.

In the condenser lens 11d, the numerical aperture NA is preferably 0.4 or less. That is, the condenser lens 11d preferably has an F-number F of 0.2 or less. The F-number F and the number of openings NA can be converted by using the following formula.

$$F = \frac{1}{2}NA$$

The application unit 12 includes an AC power source 12a and two probes 12b. The probes 12b are electrically connected to the AC power source 12a. The probes 12b are configured to be able to be in contact with the same surface of the irradiation target S. The two probes 12b are used to make the irradiated portion of the irradiation target S insulating and to determine whether the irradiated portion of the irradiation target S is insulated.

The AC power source 12a applies an AC voltage to the irradiation target S through the two probes 12b. The AC power source 12a outputs an AC voltage, for example, in the range of 0 V or more and 130 V or less and in the range 50 Hz or more and 60 Hz or less. The AC power source 12a preferably changes the output capacity according to the sheet size, i.e., the size of the irradiation target S. For example, when the irradiation target S is a 1-m square sheet, the output capacity is preferably 0.1 KVA or more and 0.5 KVA or less.

Furthermore, the application unit 12 is configured to be able to alternately repeat, a predetermined number of times, an application period in which an AC voltage is applied between the pair of probes 12b and a non-application period in which no AC voltage is applied between the pair of probes 12b.

The irradiation unit 11 is configured not to irradiate the irradiation target S with the pulsed laser beam L while the application unit 12 repeats the application period and the non-application period.

The application unit 12 preferably applies a second AC voltage to the irradiation target S when the application unit 12 repeats the application period and the non-application period. The second AC voltage is higher than a first AC voltage that is applied to the irradiation target S when the irradiation target S is irradiated with the pulsed laser beam L.

The application period and the non-application period may have the same duration or different durations. The application period and the non-application period are each set to, for example, a duration in the range of 0.01 seconds or more and 10 seconds or less. A cycle in which the AC power source 12a repeats application of the second AC voltage and non-application of the second AC voltage, i.e., a cycle in which the AC power source 12a repeats application of the second AC voltage and does not apply the second AC voltage, is set to, for example, a duration in the range of 0.01 seconds or more and 10 seconds or less.

The stage 13 supports the irradiation target S. For example, the stage 13 is configured to be able to change the position of the irradiation target S with respect to the condenser lens 11d. In this case, the stage 13 changes the position of the irradiation target S with respect to the condenser lens 11d according to the coordinates set on the XY plane on which the irradiation target S is disposed. By changing the position of the irradiation target S with respect to the condenser lens 11d using the stage 13, it is possible to change a portion of the irradiation target S that is irradiated with the pulsed laser beam L. The stage 13 may be configured to fix the position of the irradiation target S at a single position on the XY plane.

Scanning of an irradiated portion of the irradiation target S that is irradiated with the pulsed laser beam L can be performed by the following method. Specifically, when the sheet processing apparatus 10 includes a galvano optical system, the irradiated portion can be scanned by using the galvano optical system. When the sheet processing apparatus 10 includes the stage 13 capable of changing the position of the irradiation target S on the XY plane, the irradiated portion can be scanned by using the stage 13. Furthermore, when the sheet processing apparatus 10 includes a galvano optical system and the stage 13 capable of changing the position of the irradiation target S on the XY plane, the irradiated portion can be scanned by using one or both of the galvano optical system and the stage 13.

A mounting table 14 supports the stage 13 on which the irradiation target S is located.

The sheet processing apparatus 10 includes a control unit 15 that controls driving of the irradiation unit 11 and the application unit 12. The control unit 15 includes a central processing unit and a memory. The control unit 15 may not necessarily perform all various types of processing by using software. For example, the control unit 15 may include dedicated hardware (application-specific integrated circuit: ASIC) that performs at least some of the various types of processing. The control unit 15 may be configured as a circuit including one or more dedicated hardware circuits such as ASICs, one or more processors (microcomputers) that operate according to computer programs (software), or a combination thereof. In the following, an example will be described in which the control unit 15 reads a processing program stored in a machine-readable medium and executes the processing program to output various signals.

The control unit 15 generates a control signal for irradiating the irradiation target S with the pulsed laser beam L while the pulsed laser beam L is focused on the irradiation target S. Then, the control unit 15 inputs the generated control signal to the irradiation unit 11. The irradiation unit 11 irradiates the irradiation target S with the pulsed laser beam L according to the control signal inputted from the control unit 15.

The control unit 15 generates a control signal for causing the application unit 12 to apply an AC voltage. Then, the control unit 15 inputs the generated control signal to the application unit 12. The application unit 12 applies an AC voltage to the irradiation target S according to the control signal inputted from the control unit 15.

The control unit 15 determines whether an irradiated portion formed in the irradiation target S by irradiation with the pulsed laser beam L is insulating. The control unit 15 stores information that serves as criteria for determining insulating properties of the irradiated portion. The information that serves as criteria for determining insulating properties of the irradiated portion is, for example, the resistance value of the irradiation target S when the irradiated portion is insulating.

The sheet processing apparatus 10 may have a DC power source that is used to measure the resistance value of the irradiation target S. The sheet processing apparatus 10 may include a light emitting unit and a light receiving unit that are used to evaluate the light transmittance of the irradiation target S.

<EC Element>

An EC element will be described with reference to FIGS. 2 and 3. As described above, the EC element is an example of the sheet to be processed.

Figure 2:
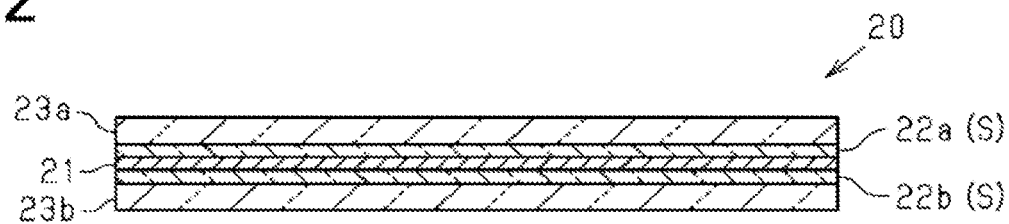
FIG. 2 is a cross-sectional view showing a structure of an EC element.

As shown in FIG. 2, an EC element 20 includes an electrolyte layer 21, a pair of transparent conductive layers 22a and 22b, and a pair of transparent sheets 23a and 23b. The transparent sheets 23a and 23b have a higher transmittance to the pulsed laser beam L than the transparent conductive layers 22a and 22b.

The transparent sheets 23a and 23b are made of synthetic resin or inorganic glass. The synthetic resin may be, for example, polyethylene terephthalate (PET), polyethylene naphthalate (PEN), polypropylene (PP), polycarbonate (PC), or the like. The transparent sheets 23a and 23b may have a single-layer structure or a multilayer structure. When the transparent sheets 23a and 23b have a multilayer structure, a plurality of layers constituting the multilayer structure may include layers made of different materials.

The transparent conductive layers 22a and 22b are made of, for example, a transparent conductive oxide (TCO). The TCO may be, for example, indium tin oxide (ITO), zinc oxide (ZnO), tin oxide ($SnO_2$), or the like. The transparent conductive layers 22a and 22b may be made of, for example, carbon nanotubes or poly(3,4-ethylenedioxythiophene).

In the present embodiment, as described above, the pulsed laser beam L generated by the laser source 11a has an infrared wavelength; thus, it is preferable that the transparent conductive layers 22a and 22b be made of ITO and the transparent sheets 23a and 23b be made of any of the synthetic resins described above. ITO has high absorption characteristics for light in the infrared range. Accordingly, the transparent conductive layers 22a and 22b made of ITO are more likely to lead to a large difference between the amount of energy absorbed from the pulsed laser beam L by the transparent conductive layers 22a and 22b and the amount of energy absorbed from the pulsed laser beam L by the transparent sheets 23a and 23b.

At least one of the first transparent conductive layer 22a and the second transparent conductive layer 22b is the irradiation target S to be irradiated with the pulsed laser beam L. In the present embodiment, both the first transparent conductive layer 22a and the second transparent conductive layer 22b are the irradiation targets S. When the first transparent conductive layer 22a is irradiated with the pulsed laser beam L, the first transparent conductive layer 22a is irradiated with the pulsed laser beam L through the first transparent sheet 23a. When the second transparent conductive layer 22b is irradiated with the pulsed laser beam L, the second transparent conductive layer 22b is irradiated with the pulsed laser beam L through the second transparent sheet 23b.

The electrolyte layer 21 is sandwiched between the pair of transparent conductive layers 22a and 22b in the thickness direction of the electrolyte layer 21. The electrolyte layer 21 contains an electrochromic material (hereinafter also referred to as an EC material) containing a metal.

Figure 3A:
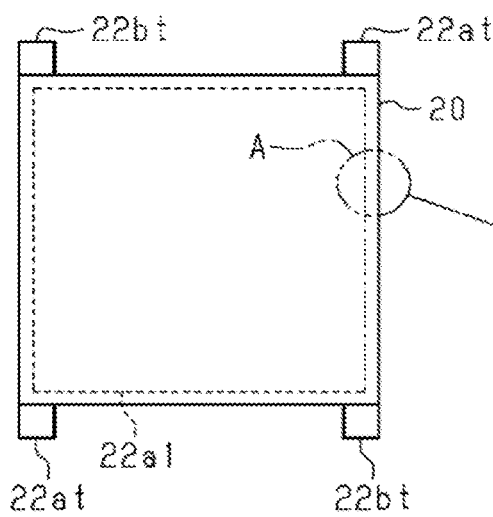
FIGS. 3A and 3B are a set of diagrams, which are an enlarged view and a plan view showing a part of the structure of the EC element.
Figure 3B:
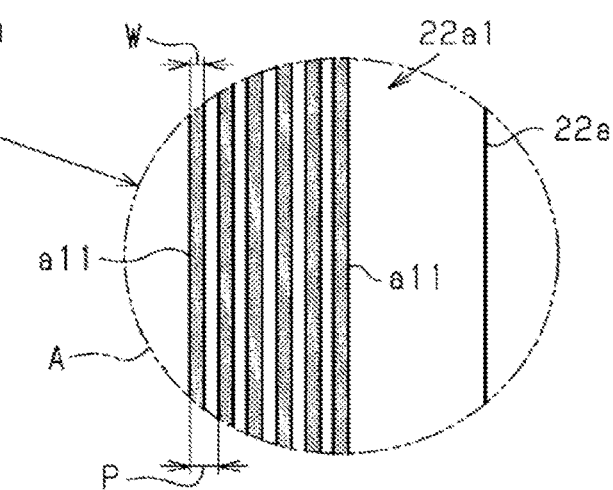

FIG. 3A shows a planar structure of the EC element 20 after processing. FIG. 3B is an enlarged view showing a part of an irradiated portion of the first transparent conductive layer 22a of the EC element 20 that is irradiated with the pulsed laser beam L. An irradiated portion formed in the second transparent conductive layer 22b is equivalent to the irradiated portion formed in the first transparent conductive layer 22a; thus, the irradiated portion of the second transparent conductive layer 22b will not be described in detail.

As shown in FIG. 3A, the EC element 20 has, for example, a quadrilateral shape, as viewed in the thickness direction of the electrolyte layer 21. The EC element 20 may not necessarily have the quadrilateral shape, and the EC element 20 may have any shape, for example, a shape such as a circular shape or a polygonal shape other than the quadrilateral shape.

The first transparent conductive layer 22a includes a pair of first terminal portions 22at. The pair of first terminal portions 22at are located, for example, on a diagonal line set on the first transparent conductive layer 22a, as viewed in the thickness direction of the electrolyte layer 21, in other words, as viewed perpendicular to the plane on which the first transparent conductive layer 22a is disposed. Each of the first terminal portions 22at is located at a corner of the EC element 20, as viewed in the thickness direction of the electrolyte layer 21, in other words, as viewed perpendicular to the plane on which the first transparent conductive layer 22a is disposed. Each of the first terminal portions 22at has a shape and size protruding outward from the outer edge of the EC element 20, i.e., the first transparent sheet 23a. One of the pair of first terminal portions 22at is connected to one of the probes 12b, and the other of the pair of first terminal portions 22at is connected to the other probe 12b.

The second transparent conductive layer 22b includes a pair of second terminal portions 22bt. The pair of second terminal portions 22bt are located, for example, on a diagonal line set on the second transparent conductive layer 22b, as viewed in the thickness direction of the electrolyte layer 21, in other words, as viewed perpendicular to the plane on which the first transparent conductive layer 22b is disposed. Each of the second terminal portions 22bt is located at a corner of the EC element 20, as viewed in the thickness direction of the electrolyte layer 21. Each of the second terminal portions 22bt has a shape and size protruding outward from the outer edge of the EC element 20, i.e., the first transparent sheet 23b. One of the pair of second terminal portions 22bt is connected to one of the probes 12b, and the other of the pair of second terminal portions 22bt is connected to the other probe 12b.

As viewed in the thickness direction of the electrolyte layer 21, the first terminal portions 22at of the first transparent conductive layer 22a are located at the corners of the EC element 20 different from the corners of the EC element 20 at which the second terminal portions 22bt of the second transparent conductive layer 22b are located. The first transparent conductive layer 22a and the second transparent conductive layer 22b may be configured such that as viewed in the thickness direction of the electrolyte layer 21, one of the first terminal portions 22at of the first transparent conductive layer 22a overlaps with one of the second terminal portions 22bt of the second transparent conductive layer 22b and the other first terminal portion 22at of the first transparent conductive layer 22a overlaps with the other second terminal portion 22bt of the second transparent conductive layer 22b.

The first transparent conductive layer 22a has an irradiated portion 22a1 that is formed along the outer edge of the first transparent conductive layer 22a. The irradiated portion 22a1 is a portion of the first transparent conductive layer 22a that is irradiated with the pulsed laser beam L. In the example shown in FIG. 3A, the irradiated portion 22a1 is formed along the entire outer edge of the first transparent conductive layer 22a, and thus the irradiated portion 22a1 has a closed ring shape. The irradiated portion 22a1 may be formed along only a part of the outer edge of the first transparent conductive layer 22a. That is, the irradiated portion 22a1 may not necessarily have the closed ring shape, and may have, for example, a straight line shape, or a linear shape having one or more bending points.

According to the sheet processing apparatus 10, by changing a portion of the first transparent conductive layer 22a on which the pulsed laser beam L is focused, it is possible to change the position of the irradiated portion 22a1 in the first transparent conductive layer 22a. Thus, according to the sheet processing apparatus 10, it is possible to form the irradiated portion 22a1 having a desired shape at a desired position in the first transparent conductive layer 22a.

The enlarged view of a region A surrounded by the dash-dot-dot line shows a part of the irradiated portion 22a1. The irradiated portion 22a1 is composed of one or more modified portions a11. The modified portion a11 has a shape corresponding to a path of the pulsed laser beam L with which the first transparent conductive layer 22a is irradiated. In the present embodiment, the modified portion a11 has a linear shape extending along the outer edge of the first transparent conductive layer 22a. A width W is a length of the modified portion a11 in a direction perpendicular to the direction in which the outer edge of the first transparent conductive layer 22a extends. The width W of the modified portion a11 is, for example, 10 µm or more and 100 µm or less.

The irradiated portion 22a1 may be composed of a plurality of modified portions a11. In the example shown in FIG. 3B, the irradiated portion 22a1 is composed of 6 modified portions a11. When the irradiated portion 22a1 is composed of a plurality of modified portions a11, the plurality of modified portions a11 are arranged in a direction perpendicular to the direction in which the modified portions a11 extend. That is, the plurality of modified portions a11 are arranged substantially parallel to each other. A pitch P is the sum of the width W of a first modified portion a11 and the distance between the first modified portion a11 and a second modified portion a11 adjacent to the first modified portion a11. The pitch P between the modified portions a11 is, for example, 20 µm or more and 200 µm or less. Thus, when the pitch P between the modified portions a11 is 20 µm or more and 200 µm or less, by setting the number of modified portions a11 to 6 or less, the width of the irradiated portion 22a1 becomes smaller than the resolution of the human eye. Accordingly, the irradiated portion 22a1 is not visually recognized by an observer of the EC element 20, thus preventing deterioration in designability of the EC element 20 and improving reliability of insulation by the entire irradiated portion 22a1.

The modified portion a11 does not have conductivity. The modified portion a11 is a portion in which at least part of the material constituting the first transparent conductive layer 22a has been lost from the portion of the first transparent conductive layer 22a that is irradiated with the pulsed laser beam L. For example, the modified portion a11 may be a portion in which the composition has been changed by irradiation with the pulsed laser beam L and thus the conductivity is lost. In such a case, since the modified portion a11 does not have conductivity, portions of the first transparent conductive layer 22a that are adjacent to each other via the modified portion a11 are insulated from each other.

Alternatively, the modified portion a11 may be a portion that has been lost due to irradiation with the pulsed laser beam L and in which the conductivity is lost, i.e., a void that has been formed in the first transparent conductive layer 22a by irradiation with the pulsed laser beam L and in which the conductivity is lost. Also in such a case, portions of the first transparent conductive layer 22a that are adjacent to each other via the modified portion a11 are insulated from each other.

In the first transparent conductive layer 22a, the modified portion a11 has a reflectance different from that of a portion of the first transparent conductive layer 22a other than the modified portion a11. Furthermore, in the first transparent conductive layer 22a, the modified portion a11 has a refractive index different from that of a portion of the first transparent conductive layer 22a other than the modified portion a11.

It can be determined whether the irradiated portion 22a1 is insulating, by measuring the resistance value of the first transparent conductive layer 22a or by measuring the light transmittance of the EC element 20. Both the resistance value and the light transmittance may be measured to determine whether the irradiated portion 22a1 is insulating.

When the resistance value of the first transparent conductive layer 22a is measured, for example, in the sheet processing apparatus 10, one of the two probes 12b is connected to one of the first terminal portions 22at and the other of the two probes 12b is connected to the other first terminal portion 22at. Then, the sheet processing apparatus 10 applies a DC voltage between the probes 12b, and measures the resistance value of the first transparent conductive layer 22a. In the case where the irradiated portion 22a1 is insulating, the resistance value of the first transparent conductive layer 22a is higher than in the case where the irradiated portion 22a1 is not insulating. For example, when the resistance value of the first transparent conductive layer 22a is 1 MΩ or more, it can be determined that the irradiated portion 22a1 is insulating.

When the transmittance of the EC element 20 is measured, for example, in the sheet processing apparatus 10, one of the probes 12b is connected to one of the first terminal portions 22at of the first transparent conductive layer 22a and the other probe 12b is connected to one of the second terminal portions 22bt of the second transparent conductive layer 22b. Then, the sheet processing apparatus 10 applies a voltage for depositing the EC material between the terminal portions 22at and 22bt. At this time, when, as viewed in the thickness direction of the electrolyte layer 21, the light transmittance is changed in a portion of the EC element 20 outside the irradiated portion 22a1 and the light transmittance is not changed in a portion of the EC element 20 inside the irradiated portion 22a1, it can be determined that the irradiated portion 22a1 has become insulating. On the other hand, when the light transmittance is changed in the entire EC element 20, it can be determined that the irradiated portion 22a1 has not become insulating.

The light transmittance of the EC element 20 can be determined, for example, on the basis of the results obtained by capturing an image of the EC element 20. Alternatively, the light transmittance of the EC element 20 can be determined by using an irradiation unit that irradiates the EC element 20 with light and a light receiving unit that receives the light with which the EC element 20 is irradiated by the irradiation unit. In this case, the irradiation unit and the light receiving unit sandwich a portion of the EC element 20 to be used to determine whether the light transmittance is changed depending on whether the voltage is applied. Then, both when the voltage is applied and when no voltage is applied, the light with which the EC element 20 is irradiated by the irradiation unit is received by the light receiving unit through the EC element 20. When the intensity of the light received by the light receiving unit is changed by a predetermined value or more depending on whether the voltage is applied, it can be determined that the light transmittance of the EC element 20 is changed. On the other hand, when the intensity of the light received by the light receiving unit is changed only by a value less than the predetermined value depending on whether the voltage is applied, it can be determined that the light transmittance of the EC element 20 is not changed.

<Method of Processing EC Element>

A method of processing the EC element 20 will be described with reference to FIG. 4. A process described below with reference to the drawings is performed during implementation of the method of processing the EC element 20. The process is performed by the control unit 15 of the sheet processing apparatus 10, or the control unit 15 causes the irradiation unit 11 or the application unit 12 of the sheet processing apparatus 10 to perform the process. A process applied to the second transparent conductive layer 22b is equivalent to a process applied to the first transparent conductive layer 22a. Thus, in the following, the case where the first transparent conductive layer 22a is the irradiation target S will be described, and the case where the second transparent conductive layer 22b is the irradiation target S will not be described.

The method of processing the EC element 20 is a method of processing the EC element 20 including the transparent sheets 23a and 23b, the transparent conductive layer 22a covered with the transparent sheet 23a, and the transparent conductive layer 22b covered with the transparent sheet 23b.

The method of processing the EC element 20 includes an irradiation step of irradiating the transparent conductive layers 22a and 22b with the pulsed laser beam L through the transparent sheets 23a and 23b. The irradiation step includes irradiating the transparent conductive layers 22a and 22b with the pulsed laser beam L having a top-hat intensity distribution while focusing the pulsed laser beam L on the transparent conductive layers 22a and 22b. The transparent sheets 23a and 23b have a higher transmittance to the pulsed laser beam L than the transparent conductive layers 22a and 22b.

By using the top-hat pulsed laser beam L that has a more uniform intensity distribution in a cross section perpendicular to the optical axis than a Gaussian laser beam, it is possible to prevent the power density of the pulsed laser beam L from increasing only in part of the transparent sheets 23a and 23b covering the irradiation target S irradiated with the pulsed laser beam L. This prevents deformation and degradation of the transparent sheets 23a and 23b. Furthermore, the use of the pulsed laser beam L enables a period in which the transparent sheets 23a and 23b and the transparent conductive layers 22a and 22b are irradiated with the pulsed laser beam L and a period in which the transparent sheets 23a and 23b and the transparent conductive layers 22a and 22b are not irradiated with the pulsed laser beam L to be alternately repeated; thus, the transparent sheets 23a and 23b are less likely to be heated. This also prevents deformation and degradation of the transparent sheets 23a and 23b. The top-hat pulsed laser beam L achieves a uniform intensity of the pulsed laser beam L with which the irradiation target S is irradiated.

In the situation where deformation and degradation of the transparent sheets 23a and 23b are prevented as described above, the transparent conductive layers 22a and 22b on which the pulsed laser beam L is focused are irradiated with the pulsed laser beam L, thus allowing insulation by the irradiated portions. By the method in which the irradiated portions are made insulating by irradiation with the pulsed laser beam L, it is possible to prevent water and foreign matter from permeating into a portion of the transparent conductive layer 22a that is located closer to the center of the transparent conductive layer 22a than the irradiated portion and a portion of the transparent conductive layer 22b that is located closer to the center of the transparent conductive layer 22b than the irradiated portion. As a result, outer peripheral portions of the transparent conductive layers 22a and 22b can be ensured to be insulated from the portions of the transparent conductive layers 22a and 22b other than the outer peripheral portions.

The method of processing the EC element 20 will be described in detail with reference to the drawings. In the following, the method of processing the EC element 20 will be described in which the modified portion a1 is formed in the first transparent conductive layer 22a. The EC element 20 is placed on the stage 13 so that on the optical axis of the pulsed laser beam L with which the EC element 20 is irradiated, the distance between the first transparent sheet 23a and the condenser lens 11d is smaller than the distance between the first transparent conductive layer 22a and the condenser lens 11d.

Figure 4:
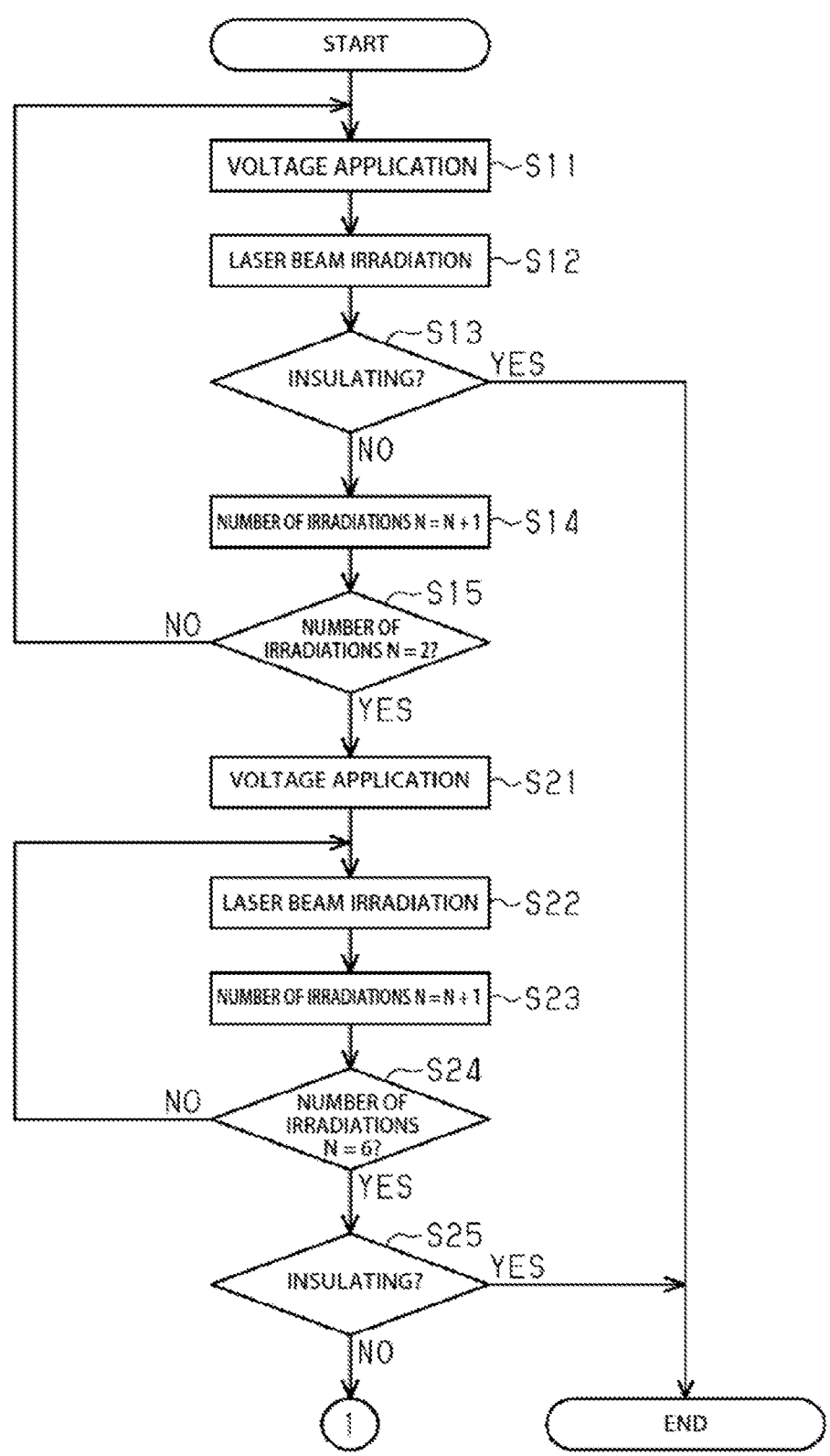
FIG. 4 is a flow chart showing a sheet processing method of the embodiment.

As shown in FIG. 4, first, the control unit 15 causes the application unit 12 to apply the first AC voltage to the first transparent conductive layer 22a through the probe 12b (step S11). This step is an application step.

Then, the control unit 15 causes the irradiation unit 11 to irradiate the EC element 20 with the pulsed laser beam L while the first AC voltage is continuously applied to the first transparent conductive layer 22a by the application unit 12 (step S12). This step is an irradiation step. As described above, the pulsed laser beam L is preferably ultrashort pulsed light. Since ultrashort pulsed light is used as the pulsed laser beam L, when the transparent conductive layers 22a and 22b are irradiated with the pulsed laser beam L through the transparent sheets 23a and 23b, the transparent sheets 23a and 23b are less likely to be heated. This further prevents deformation and degradation of the transparent sheets 23a and 23b.

At this time, the control unit 15 drives the irradiation unit 11 to cause the irradiation unit 11 to irradiate the first transparent conductive layer 22a with the pulsed laser beam L while the pulsed laser beam L is focused on the first transparent conductive layer 22a. Thus, the method of processing the EC element 20 includes the application step of applying the first AC voltage to the transparent conductive layer during the irradiation step. In the irradiation step, the first transparent conductive layer 22a is scanned with the pulsed laser beam L to form a single modified portion all in the first transparent conductive layer 22a. The first AC voltage is applied to the transparent conductive layers 22a and 22b while the transparent conductive layers 22a and 22b are irradiated with the pulsed laser beam L; thus, the irradiated portions of the transparent conductive layers 22a and 22b that are irradiated with the pulsed laser beam L are more easily made insulating than in the case where no first AC voltage is applied to the transparent conductive layers 22a and 22b.

Then, the control unit 15 stops the application of the first AC voltage and the irradiation with the pulsed laser beam L and forms a single modified portion all to determine whether the irradiated portion 22a1 is insulating (step S13). As described above, it can be determined whether the irradiated portion 22a1 is insulating, according to at least one of the resistance value of the first transparent conductive layer 22a and the light transmittance of the EC element 20.

In the case where the resistance value of the first transparent conductive layer 22a is used to determine whether the irradiated portion 22a1 is insulating, the control unit 15 causes one of the probes 12b to be connected to one of the first terminal portions 22at of the first transparent conductive layer 22a, and causes the other probe 12b to be connected to the other first terminal portion 22at of the first transparent conductive layer 22a. Then, the control unit 15 causes a DC voltage to be applied between the pair of first terminal portions 22at, and measures the resistance value of the first transparent conductive layer 22a at this time. When the measured resistance value is a predetermined value or more, the control unit 15 determines that the irradiated portion 22a1 is insulating (YES in step S13). On the other hand, when the measured resistance value is less than the predetermined value, the control unit 15 determines that the irradiated portion 22a1 is not insulating (NO in step S13).

On the other hand, in the case where the light transmittance of the EC element 20 is used to determine whether the irradiated portion 22a1 is insulating, the control unit 15 causes one of the probes 12b to be connected to one of the first terminal portions 22at of the first transparent conductive layer 22a, and causes the other probe 12b to be connected to one of the second terminal portions 22bt of the second transparent conductive layer 22b. Then, the control unit 15 causes a voltage to be applied between the pair of terminal portions 22at and 22bt, and on the basis of the light transmittance of the EC element 20 at this time, the control unit 15 determines whether the irradiated portion 22a1 is insulated. When the light transmittance is changed in a portion of the EC element 20 outside the irradiated portion 22a1 and the light transmittance is not changed in a portion of the EC element 20 inside the irradiated portion 22a1, the control unit 15 determines that the irradiated portion 22a1 is insulating (YES in step S13). On the other hand, when the light transmittance is changed in the entire EC element 20, the control unit 15 determines that the irradiated portion 22a1 is not insulating (NO in step S13).

When the control unit 15 determines that the irradiated portion 22a1 is insulating (YES in step S13), the control unit 15 temporarily ends the process related to the processing of the EC element 20.

On the other hand, when the control unit 15 determines that the irradiated portion 22a1 is not insulating (NO in step S13), the control unit 15 adds 1 to the number of irradiations n of the EC element 20 with the pulsed laser beam L (step S14), and determines whether the number of irradiations n after the addition of 1 is 2 (step S15).

When the control unit 15 determines that the number of irradiations n is not 2 (NO in step S15), the control unit 15 causes the application unit 12 to apply the first AC voltage again to the pair of first terminal portions 22at of the first transparent conductive layer 22a (step S11). Next, the control unit 15 causes the irradiation unit 11 to irradiate, with the pulsed laser beam L, a portion of the first transparent conductive layer 22a that is different from the portion of the first transparent conductive layer 22a irradiated with the pulsed laser beam L in the (n−1)th irradiation (step S12). Then, the control unit 15 determines whether the irradiated portion 22a1 is insulating (step S13). When the control unit 15 determines that the irradiated portion 22a1 is insulating (YES in step S13), the control unit 15 temporarily ends the process related to the processing of the EC element 20.

When the control unit 15 determines that the number of irradiations n is 2 (YES in step S15), the control unit 15 causes the application unit 12 to apply an AC voltage again to the pair of first terminal portions 22at of the first transparent conductive layer 22a (step S21). Next, the control unit 15 causes the irradiation unit 11 to irradiate, with the pulsed laser beam L, a portion of the first transparent conductive layer 22a that is different from the portion of the first transparent conductive layer 22a irradiated with the pulsed laser beam L in step S12 (step S22). Then, the control unit 15 adds 1 to the number of irradiations n of the EC element 20 with the pulsed laser beam L (step S23), and determines whether the number of irradiations n is equal to the maximum possible number of irradiations of the first transparent conductive layer 22a with the pulsed laser beam L (step S24). As described above, in the present embodiment, 6 is the maximum possible number of irradiations of the first transparent conductive layer 22a with the pulsed laser beam L by the irradiation unit 11. Thus, the control unit 15 determines whether the number of irradiations n is 6. When the control unit 15 determines that the number of irradiations n is not 6 (NO in step S24), the control unit 15 causes the irradiation unit 11 to repeat irradiation with the pulsed laser beam L until the number of irradiations n reaches 6.

When the control unit 15 determines that the number of irradiations n is 6 (YES in step S24), as in step S13 described above, the control unit 15 determines whether the irradiated portion 22a1 is insulated (step S25). When the control unit 15 determines that the irradiated portion 22a1 is insulating (YES in step S25), the control unit 15 temporarily ends the process related to the processing of the EC element 20.

Figure 5:
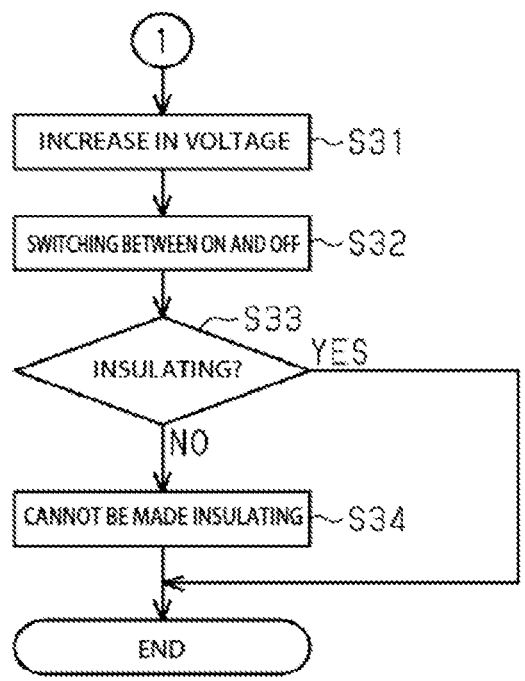
FIG. 5 is a flow chart showing the sheet processing method of the embodiment.

When the control unit 15 determines that the irradiated portion 22a1 is not insulating (NO in step S25), as shown in FIG. 5, the control unit 15 sets the AC voltage to be outputted from the AC power source 12a to a second AC voltage that is higher than the first AC voltage outputted from the AC power source 12a in step S11 and step S21 (step S31).

Then, the control unit 15 alternately repeats application and non-application of the second AC voltage in a predetermined cycle (step S32). That is, the control unit 15 alternates ON and OFF of a switch for switching application and non-application of the second AC voltage. Thus, the AC power source 12a repeats the application period and the non-application period described above in the predetermined cycle. This step is an alternation step of alternately repeating application and non-application of the second AC voltage to the first transparent conductive layer 22a. The alternation step is performed after the irradiation step and the application step. As described above, in the alternation step, the second AC voltage that is higher than the first AC voltage applied to the first transparent conductive layer 22a in the application step is applied to the first transparent conductive layer 22a.

The transparent conductive layers 22a and 22b are irradiated with the laser beam, followed by application of the second AC voltage to the transparent conductive layers 22a and 22b in the predetermined cycle; thus, even when the irradiated portion 22a1 is not made insulating by the irradiation step, it is possible to make the irradiated portion insulating. This allows more reliable insulation by the irradiated portion 22a1.

Then, as in step S13 and step S25, the control unit 15 ends the switching between application and non-application of the second AC voltage, and determines whether the irradiated portion 22a1 is insulating (step S33). When the control unit 15 determines that the irradiated portion 22a1 is insulating (YES in step S33), the control unit 15 temporarily ends the process related to the processing of the EC element 20. On the other hand, when the control unit 15 determines that the irradiated portion 22a1 is not insulating (NO in step S33), the control unit 15 determines that the first transparent conductive layer 22a cannot be made insulating (step S34), and temporarily ends the process related to the processing of the EC element 20.

When the control unit 15 determines that the first transparent conductive layer 22a cannot be made insulating, the control unit 15 preferably notifies members outside the sheet processing apparatus 10 that the first transparent conductive layer 22a cannot be made insulating. The notification performed by the control unit 15 may be, for example, a sound notification using a buzzer or the like, or a text information notification using a display device.

As described above, the embodiment of the sheet processing method and the sheet processing apparatus can achieve the following effects.

(1) The use of the top-hat pulsed laser beam L having a uniform intensity distribution prevents the power density of the pulsed laser beam L from being high only in part of the transparent sheets 23a and 23b covering the irradiation target S irradiated with the pulsed laser beam L. This prevents deformation and degradation of the transparent sheets 23a and 23b.

(2) Furthermore, the use of the pulsed laser beam L enables the period in which the transparent sheets 23a and 23b and the transparent conductive layers 22a and 22b are irradiated with the pulsed laser beam L and the period in which the transparent sheets 23a and 23b and the transparent conductive layers 22a and 22b are not irradiated with the pulsed laser beam L to be alternately repeated; thus, the transparent sheets 23a and 23b are less likely to be heated. This also prevents deformation and degradation of the transparent sheets 23a and 23b.

(3) In the situation where deformation and degradation of the transparent sheets 23a and 23b are prevented as described above, the transparent conductive layers 22a and 22b on which the pulsed laser beam L is focused are irradiated with the pulsed laser beam L, thus allowing insulation by the irradiated portions. By the method in which the irradiated portions are made insulating by irradiation with the pulsed laser beam L, it is possible to prevent water and foreign matter from permeating into the portion of the transparent conductive layer 22a that is located closer to the center of the transparent conductive layer 22a than the irradiated portion and the portion of the transparent conductive layer 22b that is located closer to the center of the transparent conductive layer 22b than the irradiated portion. As a result, outer peripheral portions of the transparent conductive layers 22a and 22b can be ensured to be insulated from the portions of the transparent conductive layers 22a and 22b other than the outer peripheral portions.

(4) For example, it is possible to prevent deformation and degradation of the transparent sheets 23a and 23b made of a synthetic resin while making the irradiated portions of the transparent conductive layers 22a and 22b made of a transparent conductive oxide insulating.

(5) The first AC voltage is applied to the transparent conductive layers 22a and 22b while the transparent conductive layers 22a and 22b are irradiated with the pulsed laser beam L; thus, the irradiated portions of the transparent conductive layers 22a and 22b that are irradiated with the pulsed laser beam L are more easily made insulating than in the case where no first AC voltage is applied to the transparent conductive layers 22a and 22b.

(6) The transparent conductive layers 22a and 22b are irradiated with the laser beam, followed by application of the second AC voltage to the transparent conductive layers 22a and 22b in the predetermined cycle; thus, even when the irradiated portions are in the middle of being made insulating in the irradiation step, it is possible to make the irradiated portions insulating. This allows more reliable insulation of the irradiated portions.

(7) ITO has high absorbing properties for light in the infrared range. Thus, when the transparent conductive layers 22a and 22b are irradiated with the pulsed laser beam L through the transparent sheets 23a and 23b, a large difference is more likely to occur between the amount of energy absorbed from the pulsed laser beam L by the transparent conductive layers 22a and 22b and the amount of energy absorbed from the pulsed laser beam L by the transparent sheets 23a and 23b. This makes it possible to prevent deformation and degradation of the transparent sheets 23a and 23b while making parts of the transparent conductive layers 22a and 22b insulating.

The foregoing embodiment may be appropriately modified and implemented as follows.

<Irradiation Target>

The transparent conductive layer may not necessarily be composed of a transparent oxide semiconductor made of ITO or the like, and may be made of, for example, metal, a conductive metal compound, a conductive polymer, or the like.

Figure 6:
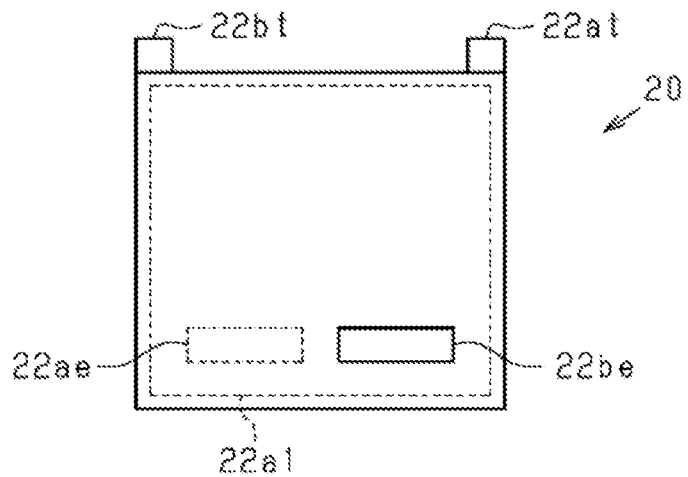
FIG. 6 is a plan view showing a structure of an EC element of a modification.

As shown in FIG. 6, the EC element 20 including the irradiation target S may include a first electrode portion 22ae and a second electrode portion 22be. The electrode portion 22ae includes a terminal for connecting the transparent conductive layer 22a to an external power source that applies a voltage between the transparent conductive layers 22a and 22b. The electrode portion 22be includes a terminal for connecting the transparent conductive layer 22b to the external power source that applies a voltage between the transparent conductive layers 22a and 22b.

The first electrode portion 22ae is exposed to the outside of the EC element 20 through openings that are formed in the electrolyte layer 21, the second transparent conductive layer 22b, and the second transparent sheet 23b. The second electrode portion 22be is exposed to the outside of the EC element 20 through openings that are formed in the electrolyte layer 21, the first transparent conductive layer 22a, and the first transparent sheet 23a. The EC element 20 includes a single first terminal portion 22at and a single second terminal portion 22bt.

When the first transparent conductive layer 22a is irradiated with the pulsed laser beam L, in the application step, the first AC voltage is applied to the first transparent conductive layer 22a through the first electrode portion 22ae and the first terminal portion 22at. On the other hand, when the second transparent conductive layer 22b is irradiated with the pulsed laser beam L, in the application step, the first AC voltage is applied to the second transparent conductive layer 22b through the second electrode portion 22be and the second terminal portion 22bt.

When it is determined whether the irradiated portion of the EC element 20 irradiated with the pulsed laser beam L is insulating, as described above, it can be determined whether the irradiated portion is insulating, according to at least one of the resistance values of the transparent conductive layers 22a and 22b and the light transmittance of the EC element 20.

In the case where the resistance value of the first transparent conductive layer 22a is used to determine whether the irradiated portion is insulating, the probes 12b are connected to the first electrode portion 22ae and the first terminal portion 22at. Then, a DC voltage is applied between the probes 12b, and thus the resistance value of the first transparent conductive layer 22a can be measured. In the case where the resistance value of the second transparent conductive layer 22b is used to determine whether the irradiated portion is insulating, the probes 12b are connected to the second electrode portion 22be and the second terminal portion 22bt. Then, a DC voltage is applied between the probes 12b, and thus the resistance value of the second transparent conductive layer 22b can be measured.

In the case where the light transmittance of the EC element 20 is used to determine whether the irradiated portion is insulating, the probes 12b are connected to the first electrode portion 22ae and the second electrode portion 22be. Then, a voltage for depositing the EC material is applied between the probes 12b. The light receiving unit receives both first light that has passed through a first portion of the first transparent conductive layer 22a that includes the modified portion all and second light that has passed through a second portion of the first transparent conductive layer 22a that includes no modified portion all. Furthermore, the light receiving unit receives the first light and the second light both while the voltage is applied to the EC element 20 and while no voltage is applied to the EC element 20.

Then, a first intensity difference is calculated. The first intensity difference is a difference between the intensity of the first light received when the voltage is applied to the EC element 20 and the intensity of the first light received when no voltage is applied to the EC element 20. Furthermore, a second intensity difference is calculated. The second intensity difference is a difference between the intensity of the second light received when the voltage is applied to the EC element 20 and the intensity of the second light received when no voltage is applied to the EC element 20. When a difference between the first intensity difference and the second intensity difference is a predetermined value or more, it can be determined that the modified portion all is insulating.

<Laser Beam>

The pulsed laser beam L may not necessarily have an infrared wavelength. For example, the laser beam may have a wavelength in the visible region or in the ultraviolet region. Even in the case where the pulsed laser beam L has such a wavelength, when the pulsed laser beam L is a top-hat pulsed laser beam and the transparent sheets 23a and 23b have a higher transmittance of the pulsed laser beam L than the transparent conductive layers 22a and 22b, an effect similar to the effect (1) described above can be obtained.

<Alternation Step>

In the alternation step, an AC voltage having the same magnitude as the AC voltage applied to the first transparent conductive layer 22a in step S11 and step S21 may be applied to the first transparent conductive layer 22a.

The method of processing the EC element 20 may not necessarily include the alternation step. Even in such a case, as long as the method of processing the EC element 20 includes the irradiation step, an effect similar to the effect (1) described above can be obtained.

The alternation step may be performed even after the control unit 15 determines in step S13 and step S25 that the irradiated portion 22a1 is insulating.

<Application Step>

The application step may be started after the irradiation step. In such a case, the application step may be started and ended during the irradiation step, the application step may be ended simultaneously with the irradiation step, or the application step may be ended after the irradiation step. In any of the cases, the AC voltage is applied to the transparent conductive layers 22a and 22b during the irradiation step; thus, an effect similar to the effect (4) described above can be obtained.

Even when the application step is started before the irradiation step, the application step may be ended before the irradiation step, the application step may be ended simultaneously with the irradiation step, or the application step may be ended after the irradiation step. In any of the cases, the AC voltage is applied to the transparent conductive layers 22a and 22b during the irradiation step; thus, an effect similar to the effect (4) described above can be obtained.

<Irradiation Step>

The number of irradiations of the first transparent conductive layer 22a with the pulsed laser beam L may be different from the number of irradiations of the second transparent conductive layer 22b with the pulsed laser beam L. That is, the number of modified portions all of the first transparent conductive layer 22a may be different from the number of modified portions of the second transparent conductive layer 22b.

The irradiated portion 22a1 of the first transparent conductive layer 22a and the irradiated portion of the second transparent conductive layer 22b may have different shapes.

Until the number of irradiations n of the EC element 20 with the pulsed laser beam L reaches the maximum number of times, application of the AC voltage by the application unit 12, irradiation with the pulsed laser beam L by the irradiation unit 11, and determination of insulating properties by the control unit 15 may be repeated. That is, until the number of irradiations n with the pulsed laser beam L reaches the maximum number of times, the processes from step S11 to step S14 described above with reference to FIG. 4 may be repeated. In such a case, after the number of irradiations n with the pulsed laser beam L reaches the maximum number of times, the processes from step S31 to step S34 described above with reference to FIG. 5 may be performed.

<Sheet to be Processed>

The functional sheet to be processed by the sheet processing apparatus 10 is not limited to the EC element 20, and may be, for example, a light emitting sheet, a display sheet, a sensor sheet, or the like. Even in such a case, when the sheet includes a transparent conductive layer covered with a transparent sheet and the transparent conductive layer is irradiated with the top-hat pulsed laser beam L, an effect similar to the effect (1) described above can be obtained.

The present application addresses the following. Due to the widespread use of EC elements described in the background, the range of environmental conditions in which an EC element can be applied has been expanded. For example, when the temperature range in which an EC element can be applied is expanded, a difference in thermal expansion coefficient between the layers of the EC element is assumed to be present. In the EC element, a gap is easily formed between the transparent conductive layer and the sealing portion. Accordingly, water and foreign matter may pass through the sealing portion and enter the inside of the EC element, that is, the effectiveness of sealing by the sealing portion may be deteriorated. Thus, when the range of environmental conditions in which an EC element can be applied is expanded, there is a demand to ensure insulating properties between an outer peripheral portion of the transparent conductive layer, in which a short circuit may occur, and a portion of the transparent conductive layer other than the outer peripheral portion, in which light control is required.

Such a problem is not limited to EC elements, and is common to functional sheets that include a transparent conductive layer covered with a transparent sheet and in which a portion of the transparent conductive layer is required to be insulated from another portion of the transparent conductive layer.

An aspect of the present invention is to provide a sheet processing method and a sheet processing apparatus that achieve an expandable range of environment that ensures insulating properties between a portion of a transparent conductive layer covered with a transparent sheet and another portion of the transparent conductive layer.

A sheet processing method is a sheet processing method of processing a transparent conductive layer covered with a transparent sheet. The sheet processing method includes irradiating the transparent conductive layer through the transparent sheet with a pulsed laser beam that has a top-hat intensity distribution and whose transmittance through the transparent sheet is higher than a transmittance through the transparent conductive layer, thereby insulating a portion (irradiated portion) of the transparent conductive layer that is irradiated with the pulsed laser beam.

According to the above configuration, a top-hat laser beam having a uniform intensity distribution is used; thus, the power density of the laser beam can be made uniform in the irradiated portion of the transparent conductive layer. This prevents a change in characteristics caused by irradiation with the laser beam from occurring in a portion of the transparent conductive layer other than the irradiated portion. Furthermore, irradiation with the pulsed laser beam is performed in which irradiation with a laser beam is intermittently repeated. This prevents heat generation in the transparent sheet irradiated with the laser beam. Thus, the irradiated portion can be insulated in the situation where the power density in the irradiated portion is made uniform and heat generation in the transparent sheet is prevented. This achieves an expanded range of environment that ensures insulating properties between a portion of the transparent conductive layer covered with a transparent sheet and another portion of the transparent conductive layer.

A sheet processing apparatus is a sheet processing apparatus for processing a transparent conductive layer covered with a transparent sheet. The sheet processing apparatus includes an irradiation unit that irradiates the transparent conductive layer through the transparent sheet with a pulsed laser beam that has a top-hat intensity distribution and whose transmittance through the transparent sheet is higher than a transmittance through the transparent conductive layer, and an application unit that applies an AC voltage to the transparent conductive layer. According to this configuration, the AC voltage is applied to the transparent conductive layer while the transparent conductive layer is irradiated with the laser beam; thus, the irradiated portion of the transparent conductive layer is more easily insulated than in the case where no AC voltage is applied to the transparent conductive layer.

Obviously, numerous modifications and variations of the present invention are possible in light of the above teachings. It is therefore to be understood that within the scope of the appended claims, the invention may be practiced otherwise than as specifically described herein.

What is claimed is:

1. A sheet processing method, comprising:
   irradiating a transparent conductive layer covered with a transparent sheet with a pulsed laser beam such that the pulsed laser beam is applied to a portion of the transparent conductive layer through the transparent sheet, wherein the pulsed laser beam has a top-hat intensity distribution and a pulse width of 1000 femtoseconds or less, and wherein the pulsed laser beam has a transmittance through the transparent sheet that is higher than a transmittance through the transparent conductive layer;
   applying an AC voltage to the transparent conductive layer simultaneously with irradiation by the pulsed laser beam such that the AC voltage is applied to an entire layer of the transparent conductive layer during the irradiation; and
   forming a modified portion in the transparent conductive layer at the portion irradiated with the pulsed laser beam,
   wherein the modified portion has no electrical conductivity and has a width in a range of 10 micrometers to 100 micrometers.

2. The sheet processing method according to claim 1, wherein the transparent sheet comprises a resin, and the transparent conductive layer comprises a transparent conductive oxide.

3. The sheet processing method according to claim 2, wherein the pulsed laser beam is ultrashort pulsed light.

4. The sheet processing method according to claim 2, wherein the applying the AC voltage to the transparent conductive layer while the transparent conductive layer is irradiated with the pulsed laser beam.

5. The sheet processing method according to claim 2, further comprising:
   alternately repeating application of an AC voltage to the transparent conductive layer and stopping of the application of the AC voltage to the transparent conductive layer after the irradiating.

6. The sheet processing method according to claim 2, wherein the transparent conductive layer comprises indium tin oxide, and the pulsed laser beam has an infrared wavelength.

7. The sheet processing method according to claim 1, wherein the pulsed laser beam is ultrashort pulsed light.

8. The sheet processing method according to claim 1, wherein the applying the AC voltage to the transparent conductive layer while the transparent conductive layer is irradiated with the pulsed laser beam.

9. The sheet processing method according to claim 1, further comprising:
  alternately repeating application of an AC voltage to the transparent conductive layer and stopping of the application of the AC voltage to the transparent conductive layer after the irradiating.

10. The sheet processing method according to claim 9, wherein the repeating the application and stopping of the AC voltage includes setting a duration of each of the application and stopping of the AC voltage in a range of 0.01 seconds to 10 seconds.

11. The sheet processing method according to claim 1, wherein the transparent conductive layer comprises indium tin oxide, and the pulsed laser beam has an infrared wavelength.

12. The sheet processing method according to claim 1, wherein the irradiating the transparent conductive layer includes irradiating the transparent conductive layer with the pulsed laser beam such that the portion of the transparent conductive layer has a linear shape extending along an outer edge of the transparent conductive layer.

13. The sheet processing method according to claim 1, wherein the irradiating the transparent conductive layer includes irradiating the transparent conductive layer with the pulsed laser beam such that the portion of the transparent conductive layer includes a plurality of portions each having a linear shape extending along an outer edge of the transparent conductive layer.

14. The sheet processing method according to claim 1, further comprising:
  alternately repeating application of a second AC voltage to the transparent conductive layer and stopping of the application of the second AC voltage to the transparent conductive layer after the irradiating,
  wherein the second AC voltage is higher than the AC voltage in the irradiating.

15. The sheet processing method according to claim 14, wherein the repeating the application and stopping of the second AC voltage includes setting a duration of each of the application and stopping of the AC voltage in a range of 0.01 seconds to 10 seconds.

16. A sheet processing apparatus, comprising:
  an irradiation unit comprising a laser source and an optical system and configured to irradiate a transparent conductive layer covered with a transparent sheet with a pulsed laser beam through the transparent sheet, wherein the pulsed laser beam has a top-hat intensity distribution and a pulse width of 1000 femtoseconds or less, and wherein the pulsed laser beam has a transmittance through the transparent sheet that is higher than a transmittance through the transparent conductive layer;
  an application unit comprising an AC power source and a plurality of probes and configured to apply an AC voltage to the transparent conductive layer such that the plurality of probes apply the AC voltage to an entire layer of the transparent conductive layer, wherein the plurality of probes are configured to contact a same surface of the transparent conductive layer; and
  a control unit comprising circuitry configured to simultaneously control the irradiation unit and the application unit such that the application unit applies the AC voltage to the entire layer of the transparent conductive layer during irradiation of a portion of the transparent conductive layer by the pulsed laser beam.

17. The sheet processing apparatus according to claim 16, wherein the circuitry of the control unit is configured to control the irradiation unit and the application unit such that application of an AC voltage to the transparent conductive layer and stopping of the application of the AC voltage to the transparent conductive layer are alternately repeated after the irradiating.

18. The sheet processing apparatus according to claim 16, wherein the circuitry of the control unit is configured to control the irradiation unit and the application unit such that the portion of the transparent conductive layer has a linear shape extending along an outer edge of the transparent conductive layer.

19. The sheet processing apparatus according to claim 16, wherein the circuitry of the control unit is configured to control the irradiation unit and the application unit such that application of a second AC voltage to the transparent conductive layer and stopping of the application of the second AC voltage to the transparent conductive layer are alternately repeated after the irradiating, and the second AC voltage is higher than the AC voltage in the irradiating.

20. The sheet processing apparatus according to claim 19, wherein the circuitry of the control unit is configured to control the irradiation unit and the application unit such that a duration of each of the application and stopping of the AC voltage is set in a range of 0.01 seconds to 10 seconds.

* * * * *